March 12, 1935.  E. KINSELLA  1,993,790
DISTRIBUTION OF FLUIDS
Filed Dec. 23, 1931  2 Sheets-Sheet 1
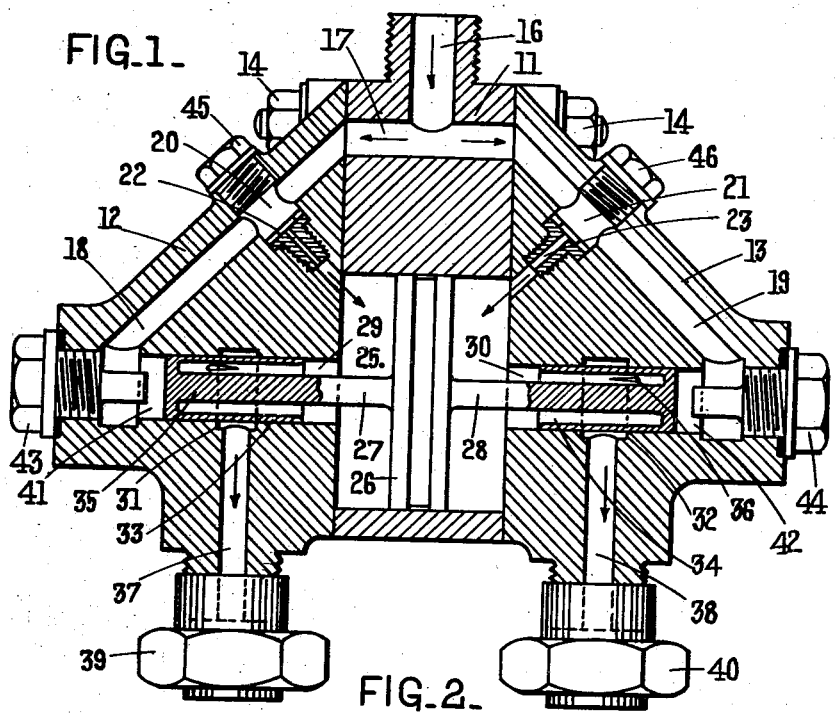
FIG.1.
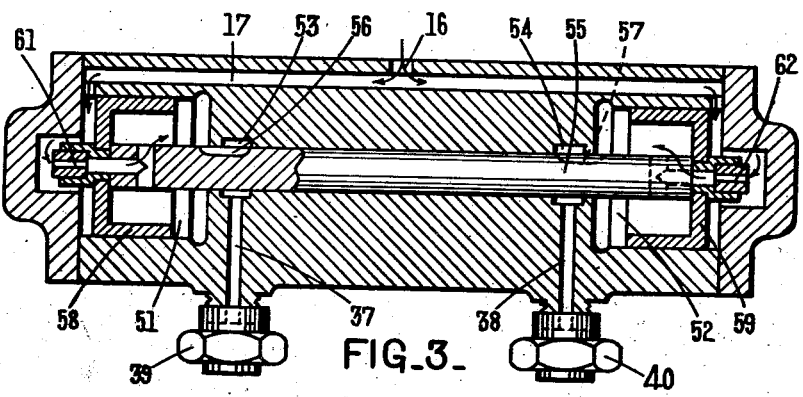
FIG.2.
FIG.3.
EDWARD KINSELLA
INVENTOR
ATTORNEYS March 12, 1935.  E. KINSELLA  1,993,790
DISTRIBUTION OF FLUIDS
Filed Dec. 23, 1931  2 Sheets-Sheet 2
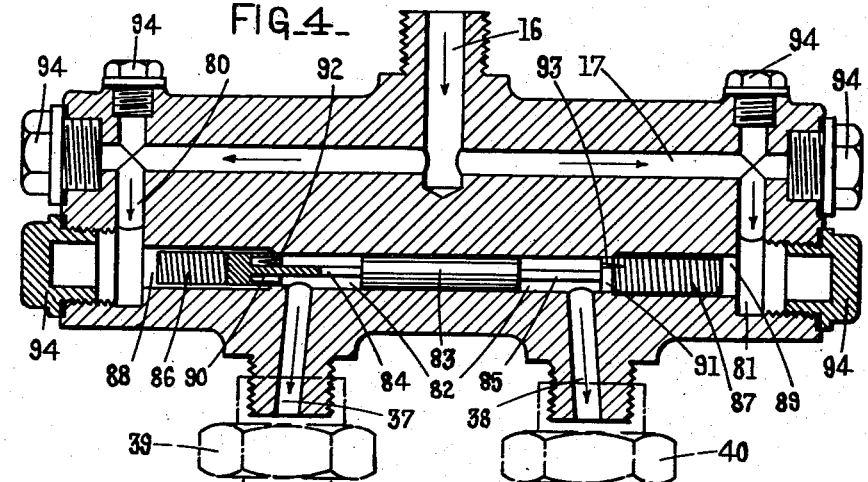
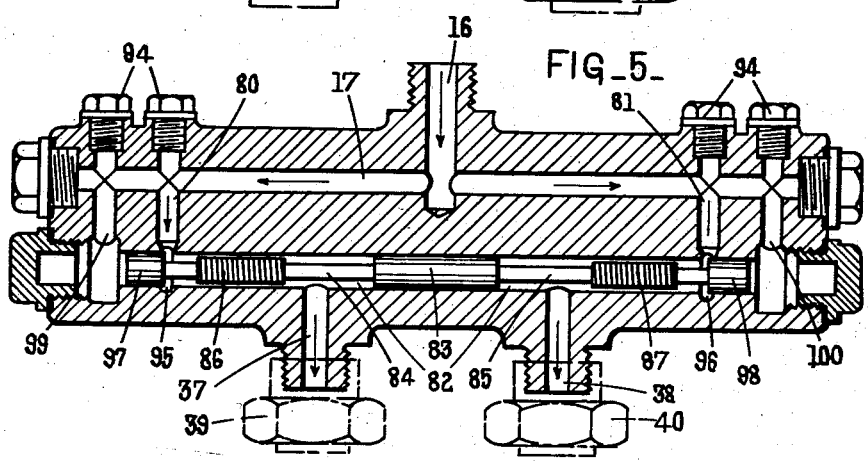
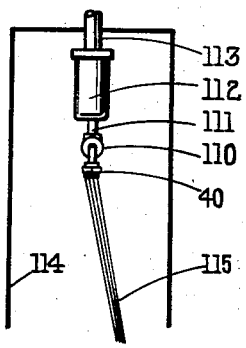
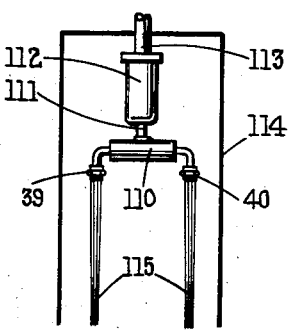
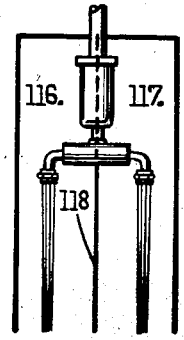
EDWARD KINSELLA
INVENTOR
ATTORNEYS Patented Mar. 12, 1935

1,993,790

UNITED STATES PATENT OFFICE 1,993,790

DISTRIBUTION OF FLUIDS

Edward Kinsella, Spondon, near Derby, England, assignor to Celanese Corporation of America, a corporation of Delaware Application December 23, 1931, Serial No. 582,746
In Great Britain February 6, 1931

6 Claims. (Cl. 188)

This invention relates to the supply and distribution of fluids, and has for its object the division of a fluid from a single source of supply into a number of paths in definite ratio, irrespective of differences and variations in the resistance to flow offered by such paths.

According to the invention, liquid from a single source of supply is led into two paths, in each of which is contained a throttling valve and a resistance to flow, the pressure drops across such resistances to flow being maintained in substantially constant ratio through the automatic adjustment of either or both of the throttling valves by and in accordance with a variation of the said ratio from the constant ratio desired, whereby the flows in the two paths are maintained in constant ratio. That is to say, the fluid in each path passes a resistance to flow so that a pressure drop is occasioned across each of such resistances. While the pressure drops are in constant ratio (preferably equal), the flows past the two resistances are in constant ratio. If this ratio is departed from, a motive force is set up (being generally the difference in the motive forces behind the two resistances) which motive force is adapted to adjust the throttled valves in such a manner as to cause the flows to return to the constant ratio, upon which the motive force ceases and the device comes into balance again.

In its simplest aspect the invention comprises the division of a liquid flow equally into two paths, and it is to this aspect of the invention that the remainder of the specification will be chiefly directed. It is to be understood, however, that while the invention can be most conveniently applied to an equal division of flow, it is clearly applicable to the division of flow into unequal parts.

Thus in a device for equal division of flow, there may be included in each path a throttling valve connected to and operated by a motor member lying in the path of the liquid, and actuated by a force depending on the rate of flow of the liquid. The throttling valves and the motor members are preferably connected all together so as to move simultaneously. Then, if the rate of flow in one path be greater than that in the other, the force on one motor member is greater than the opposing force on the other, and the motor members and valves move under the difference in force in such a manner that the faster flow in one path is decreased by increased throttling effect, while the slower flow in the other is increased by a decreased throttling effect until the flows are equal. Until the flows are equal, a difference in force exists, and adjustment will take place automatically, but as soon as the flows become equal, the difference in force disappears and the system is again in equilibrium. Adjustment of the flow is practically instantaneous on out of balance conditions arising, so that in fact there is no appreciable variation from the equality of flow desired. If desired, the flow from each or either of the two paths may be further divided into two paths, each or either of which may again be divided and so on.

Any convenient form may be adopted for the throttling device, it being preferred however, that this device should be of such a nature that the flow of the liquid past it will not exert any appreciable tractive effort, the effective tractive effort of the whole device being applied only to the motor device whereby the tractive efforts in opposite directions are independent of the position of the throttling device. Thus in the case of equal rates of flow, the device is balanced, whatever the position of the throttling device. The throttling device may, for example, be of the nature of a piston valve sliding along a passage, to open or close to a greater or lesser degree an inlet port leading into such passage or an outlet port from the passage. Or the device may be in the form of a rotary valve rotated by the motion of the motor device under a difference in flow of the two paths.

Conveniently the two throttling devices may be directly coupled together so that the opening of one necessarily involves the closing of the other. Alternatively, the two may be more indirectly coupled through the medium of the motor device.

The function of the motor device is to move under an unbalanced tractive effort caused by a difference in flow of the two paths, and thereby to operate the valves so as to increase the throttling effect upon the flow in one path, and to decrease the throttling upon that on the other. The motor device may be operated directly by the velocity of flow of the liquid, or indirectly through factors which determine or arise from such velocity of flow. Thus for example, if the liquid is flowing under pressure in each path past a resistance to flow and the velocity of flow in one path is higher than that in the other, the pressure drop across the first resistance will be higher than that across the other. If now the two resistances have a common pressure at one end, the pressures at the other ends of the resistances will differ on account of the different pressure drops, and this difference in pressure may be caused to operate the motor device, for example by acting upon opposite sides of a motor piston. The resistances may form parts of stationary passages through which the liquids flow, or may be located in the motor member itself. In the latter case the passage of the fluid through the resistances will give rise to a tractive effort upon the motor device, and the tractive effort in the two paths arising from this fact must be balanced, as in the case of pressure drops. In this manner the motor device may be caused to operate partly by pressure difference and partly by difference in fluid drag. Further, the motor device may be caused to operate purely by fluid drag, the effect of pressure as a motive force being eliminated by suitable design.

One particular useful application of the invention is in the spinning of artificial silk wherein a spinning solution is extruded through a number of orifices by means of a pump delivering a constant volume of liquid. By means of the device according to the invention, a number of sets of orifices may be served by one pump, the weight of the thread produced from each set being equal. It is to be noted that the device according to the invention is applicable to the equal division either of a fluid supplied at constant pressure or of a fluid supplied in constant volume, the separate flows in the latter case being also, of course, in constant volume. The device according to the invention may be connected directly to the delivery pipe of the pump, or more conveniently to a filter through which the liquid on leaving the pump is passed.

Several forms of apparatus according to the invention will now be described in greater detail with reference to the accompanying drawings, illustrating devices which are particularly suited to the division of flow of a spinning solution in the production of artificial silk. It is to be understood however that this description is given by way of example only and is in no respect limitative.

Figure 1 shows in section a form of device operating to produce equality of flow by pressure balance only.

Figures 2 and 3 show two forms of device in which equality of flow is produced by balancing both pressure and fluid drag.

Figures 4 and 5 show two devices operating under the tractive effects of fluid drag alone.

Figures 6 and 7 are a side elevation and a front elevation in section respectively of a dry spinning cell provided with a device as described with reference to Figure 3 and Figure 8 is a view similar to Figure 7 showing a method of spinning with one jet in each cell.

Referring to Figure 1 the body of the device is in three parts 11, 12, and 13 which are secured together by bolts and nuts, one of which is indicated at 14. The spinning solution is supplied by a pump (not shown) to a pipe 16 and passes right and left by a passage 17 to two oblique passages 18, 19 in the parts 12 and 13 respectively. Half way down the passages 18, 19 are cross passages 20, 21 which lead the solution through two resistances to flow 22, 23 into a large cylindrical space 25 in the central portion 11. The resistances 22, 23 shown are of the form of fine capillary passages, but, if desired, contracting passages giving a pressure drop due to increase of rate of flow of the fluid may be substituted. The space 25 is occupied by a closely fitting piston 26 from the centre of which rods 27, 28 pass horizontally into horizontal passages 29, 30 in the portions 12, 13.

A broad annular groove 31, 32 is provided in each of the passages 29, 30, the grooves 31, 32 being completely masked by hollow pistons 33, 34 closely fitting in the passages 29 and 30. In the walls of the hollow pistons 33, 34 however are triangular perforations 35, 36 which give access between the inside of the pistons 33, 34 and the annular grooves 31, 32. The perforations 35, 36 overlap the outer edges of the grooves 31, 32, so that an outward movement of either piston reduces the area of the perforation available to permit flow, while an inward movement increases the available area. In this manner the pistons 33, 34 constitute throttling valves. The grooves 31, 32 communicate with outlet passages 37, 38 terminating in spinning jets 39, 40 from which the spinning solution is to be extruded. The outer ends 41, 42 of the passages 29, 30 communicate with the passages 18 and 19 in order that the pressure set up on the outer faces of the pistons 33, 34 may be equal, and so not affect balancing of the device, and are closed by means of caps 43 and 44 which allow access to the inside of the passage. The cross passages 20, 21 are similarly closed by means of caps 45, 46.

So long as the rate of flow in the two paths is equal the device is balanced, but if the flow becomes unequal for any reason, e. g. on account of a blockage in one of the jets 39, 40, the pressure drops across the resistances 22, 23 become unequal also. Since the pressures at the upper ends of these resistances are equal, the resistances being joined by passages 17, 18, 19 offering substantially no resistance to flow, the pressure at the lower ends, that is in the two halves of the cylinder 25 becomes unequal, the pressure corresponding to the lower flow, that is the lower pressure drop, being higher. The unequal pressures on the two sides of the piston 26 cause the piston 26 to move, together with the piston rods 27, 28 and the throttling device 33, 34. Assuming that the flow is slower in the left hand path, the piston 26 will move to the right; this causes the triangular perforations 35 in the piston 33 to afford a greater area for the passage of the liquid into an annular groove 31, while at the same time the perforation 36 is moved also to the right and somewhat restricts the passage of the liquid into the groove 32. In this way the flow in the right hand (faster) path is throttled while the throttling in the left hand (slower) path is relieved so that flow tends to equalize. The movement continues until the pressures on the two sides of the piston 26 are equal, that is until the flow in the two paths are equal. The smallest difference in the rates of flow will give rise to a difference in pressure and a motion of the piston 26, with a result that a balanced flow is maintained with no substantial variation, any tendency to variation being immediately checked.

In the device illustrated in Figure 2, the horizontal passage 17 leads the fluid into two cylindrical chambers 51 52, the cylindrical chambers 51, 52 being of relatively large diameter and connected by a passage of smaller diameter. In the last mentioned passage are cut two annular grooves 53, 54, communicating with the outlet passages 37, 38. The said passage contains a piston rod 55 which fits closely, communication being made between the two cylindrical chambers 51, 52 and the two annular grooves 53, 54 by two short axial grooves 56, 57 on the surface of the piston rod. The axial grooves 56, 57 constitute devices which throttle the flow of the liquid, the motion of the piston 55 along the passage masking one groove to a greater degree and exposing the other, with the result that throttling is increased in the passage of the liquid along one groove and decreased in the other. The ends of the piston rod 55 carry two large hollow pistons 58, 59, the skirts of which, facing inwardly, fit closely to the walls of the cylindrical chambers 51, 52. Through the heads of the pistons 58, 59 pass relatively small passages 61, 62, connecting the ends of the cylindrical chambers 51, 52, which are in communication with the inlet 16 to the device, with the inside of the pistons 58, 59 and of the cylindrical chambers.

When the flows are equal the pressure drops in the piston heads 61, 62, are also equal and the device is in balance. When, however, the flows become unequal, the pressures in the chambers 51, 52 become unequal, and the piston rod 55 and the two pistons 58, 59, move along the axis of the device in the direction of faster flow, closing the throttle valve at the outlet of the faster flow and opening that of the slower flow until the flow is equal. In addition to the motor effect of pressure difference inside the two pistons 58, 59, there is an effect due to fluid drag in the narrow passages 61, 62. The force due to fluid drag acts inwardly along the pistons, and when flow becomes unequal, the difference in force acts in the same direction as the difference in pressure, to restore the balance.

Figure 3 shows a device operating on principles similar to those demonstrated in Figure 2, except that the flows in the two paths are directed outwardly instead of inwardly. The inlet pipe 16 to the device leads into the mid point of a hollow cylinder 65, which contains two closely fitting pistons 66, 67 connected together by a relatively thick short connecting rod 68. The inlet passage 16 leads into the annular space 69 bounded by the inner ends of the two pistons 66, 67, the connecting rod 68 and the wall of the cylinder 65. Along the length of the pistons are a number of small passages 70, which offer a resistance to the flow of the liquid through them from the middle of the cylinder 65 to the ends 71, 72. In the ends of the cylinder are the outlet passages 37, 38 to the device, which are controlled by needle valves 74, 75, carried on rod 76, 77 extending from the ends of the large pistons 66, 67 in the cylinder 65, the area of the piston valves 74, 75, being relatively small compared with the area of the pistons 66, 67.

So long as the rates of flow through the two pistons 66, 67 are equal, the pressure drops are equal, and the device is in balance. When, however, the two flows become unequal the pressure drops become unequal, the pressure at the outer end of the piston taking the slower flow being higher than that at the outer end of the other piston. The difference in pressure causes the two pistons 66, 67 to move, so that the piston valves 74, 75 increase the throttling effect on the faster flow, and reduce the throttling effect on the slower flow until the flows become equal and the device is in balance. As in Figure 2, the effect of fluid drag as the liquid passes through the resisting passages in the pistons acts in the same direction as pressure difference to restore the balance of the device.

The device shown in Figure 3 is illustrated in Figures 6, 7 and 8 in the position which it occupies in the dry spinning cell for the production of artificial filaments. The device 110 is attached to a supply pipe 111 coming from a filtering device 112 which is fed by a supply pipe 113 passing through the top of the spinning cell 114. The spinning jets 39, 40 are attached to the device, as illustrated in Figure 3, and the filaments 115 are extruded from the jets in the usual manner into the cell 114. In Figure 8 an arrangement is shown whereby the two jets 39 and 40 are disposed in separate cells 116, 117 which are separated from one another by means of a partition 118 suitably cut away so as to fit closely round the device 110 and the filtering means 112. The continuation of the partition 118 in the top of the cell is shown in dotted lines in the figure. It will be seen that the proportions of the cells 116, 117, are such that the filaments 115 are extruded symmetrically down the middle of each cell.

Figure 4 shows a form of device in which a balance is obtained of the tractive efforts due to fluid drag in the two paths. The liquid enters the supply passage 16 and is divided along a horizontal passage 17 communicating at its ends with two vertical passages 80 and 81. The vertical passages 80, 81 lead to the opposite ends of a further horizontal passage 82 from which the outlet passages 37, 38 lead to the jets 39, 40. The passage 82 is provided in the middle by a closely fitting piston 83 carrying piston rods 84, 85 at each end, which in turn are provided at their ends with pistons 86, 87 lying in slightly enlarged portions 88, 89 of the horizontal passage 82. The inner ends of the pistons 86, 87 are provided with hollow skirts 90, 91 which extend into and closely fit the narrow parts of the passage 82, V notches 92, 93 being provided in the skirts 90, 91 to permit the restricted passage of liquid from the wide parts 88, 87 to the narrow part 82 of the lower horizontal passage. The pistons 86, 87 are provided with screw threads on their outside, in order that the fluid flowing past them shall exert a considerable fluid drag effect to drive the pistons 86, 87 inwards along the passage 82.

While the rates of flow in the two paths are equal, the tractive efforts on the pistons 86, 87 are equal, and are in opposite directions, so that the device is balanced. If, however, the flow on one side, say the left side, becomes more rapid than the flow on the other, the tractive effort on the piston 86 is greater than that on the piston 87, with the result that pistons 83, 86, 87 and the piston rods 84, 85 move together to the right. This causes the skirt 90 of the piston 86 to move further into the narrow part of the piston 82 thereby masking to a greater extent the notch 92 permitting passage of the liquid into the outlet 37. At the same time, the skirt 91 of the piston 87 moves in such a manner as to unmask a greater amount on the notch 93, and to allow the liquid to flow more freely into the outlet passage 38. This motion necessarily continues until the fluid drags of the two pistons 86, 87 are equal, that is to say until the rate of flow in the two paths are equal.

It will be noted that the pressures upon the outer ends of the pistons 86, 87 are equal, since there is substantially no resistance to the fluid flow between them while inside the passage 82 the pressure on the left hand end of the piston 83 balances the pressure of the right hand end of the piston 86, and similarly on the other side of the device, so that pressure differences on two sides of the device have no effect in balancing or unbalancing. The device, however, still works in accordance with the pressure drop being directly actuated by fluid drag, a phenomenon accompanying pressure drop. The bores of the passages 17, 80, 81, 82, 99, 100 are closed by means of screw threaded caps 94.

In Figure 4 the throttling by means of which balance is effected takes place near the outlet passages 37, 38 after the fluid has passed the pistons 86, 87. The throttling however, may take place before this point, and a modification of this kind is shown in Figure 5. In this modification, the passages 80, 81 communicate with annular grooves 95, 96 in the passage 82, and these grooves are partly masked by means of pistons 97, 98 carried upon extension of the rods 84, 85 beyond the pistons 86, 87. As in Figure 1, it is necessary that the outer ends of the piston 97 shall communicate with the supply, in this case through passages 99, 100 in order to permit the free motion of the piston 97, 98. The bores 17, 80, 81, 82, 99, 100 are closed by means of removable caps 94.

In the operation of the device, a higher rate of flow in, say, the left hand passage causes a greater fluid drag to be exerted on the piston 86, than upon the piston 87. This draws the pistons 97, 98 to the right, causing the groove 95, on the left hand side to be masked to a greater degree, and the groove 96 on the right to be masked to a less degree, until the flow on the left side is throttled and the flow on the right side relieved to produce equality of flow. Until such equality is produced, the difference in drag on the pistons 86, 87 will continue, and the motion will proceed until balance is achieved.

What I claim and desire to secure by Letters Patent is:—

1. Method of dividing a supply of fluid into two parts in constant ratio which comprises dividing fluid into two separate paths, causing the fluid in each path to flow past a fixed resistance to flow, throttling the flow in each path, and, upon departure of the pressure drops across said resistances from a given ratio, simultaneously increasing the throttling effect in one path and decreasing it in the other so as to nullify said departure and maintain the amount of flow in the two paths in constant ratio.

2. Method of dividing a supply of fluid into two equal parts which comprises dividing the fluid into two separate paths, causing the fluid in the two paths to flow past equal resistances to flow, throttling the flow in each path, and in the event of inequality of the pressure drops across said resistances, simultaneously increasing the throttling effect in one path and decreasing it in the other so as to equalize the pressure drops and maintain the amounts of flow in the two paths equal.

3. Method of manufacture of artificial filaments from spinning solutions which comprises supplying the spinning solution at a constant rate, dividing said solution into two separate paths, causing the fluid in each path to flow past a fixed resistance to flow, throttling the flow in each path, and upon departure of the pressure drops across said resistance from a given ratio, simultaneously increasing the throttling effect in one path and decreasing it in the other so as to nullify such departure and maintain the amounts of flow in the two paths in constant ratio, and causing the solution in the two paths to be extruded in the form of two threads of filaments whose deniers are thereby in constant ratio.

4. Apparatus for dividing a supply of fluid into two parts in constant ratio, comprising means for dividing the fluid into two paths, means in each of said paths adapted to offer a fixed resistance to flow, throttling means in each of said paths, said throttling means being so disposed and so connected together that when the throttling effect of the one increases that of the other decreases and vice versa, and means for adjusting said throttling means upon inequality of the pressure drops across said resistances so as to restore equality of the pressure drops and to maintain the rates of flow in the two paths in constant ratio.

5. Apparatus for dividing a supply of fluid into two equal parts which comprises means for dividing the fluid into two paths, means in each of said paths adapted to offer equal resistance to fluid flow, throttling means in each of said paths, said throttling means being so disposed and so connected together that when the throttling effect of one increases that of the other decreases and vice versa, and means for adjusting said throttling means in accordance with any differences in the pressure drops across said resistances so as to equalize said pressure drops and maintain equal the rates of flow in the two paths.

6. Apparatus for the production of artificial filaments from spinning solutions which comprises means for supplying the spinning solution at a constant rate, means for dividing said solution into two paths, means in each of said paths adapted to offer a fixed resistance to flow, throttling means in each of said paths, said throttling means being so disposed and so connected together that when the throttling effect of one increases that of the other decreases and vice versa, means for adjusting said throttling means upon inequality of the pressure drops across said resistances, so as to restore such equality and maintain in constant ratio the rates of the flow in the two paths, and spinning jets in said paths through which the solution in the two paths is forced to form two threads of filaments whose deniers are thereby in constant ratio.

EDWARD KINSELLA.